R. M. & W. H. BOWMAN.
Improvement in Corn-Planters.
No. 129,924.    Patented July 30, 1872.
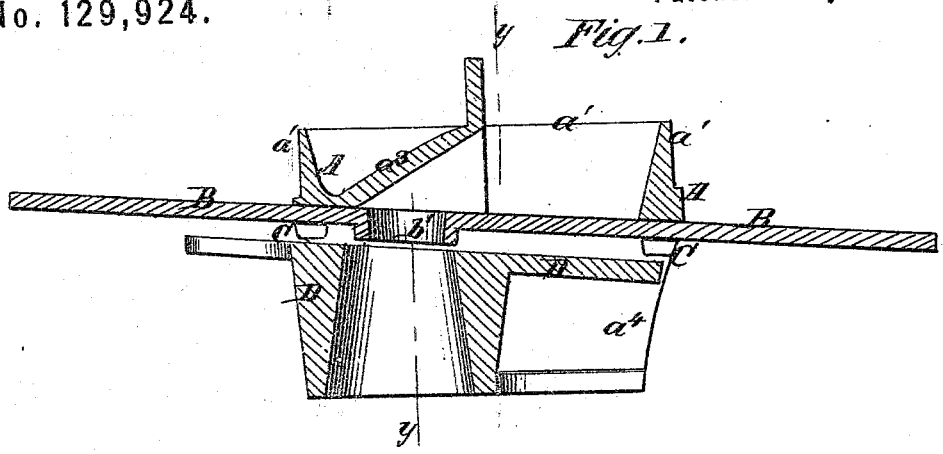
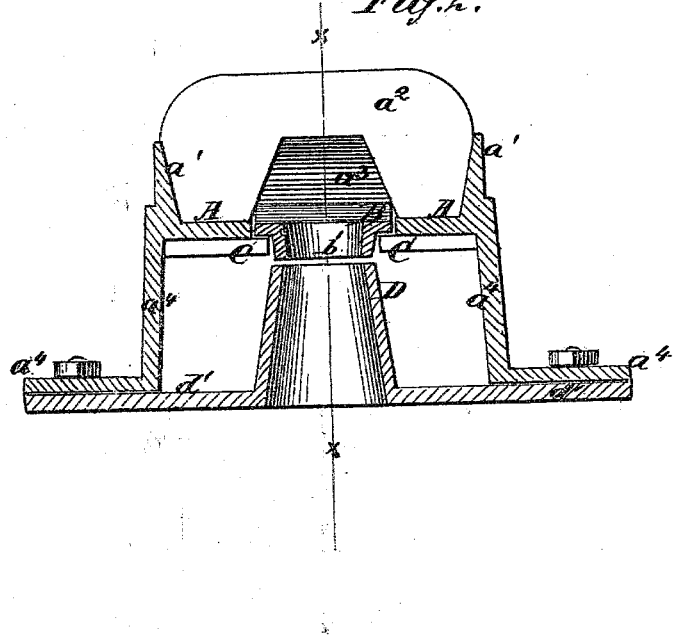
Witnesses:
John Becker
W. A. Graham
Inventor:
R. M. Bowman,
W. H. Bowman.
Per
Attorneys.

UNITED STATES PATENT OFFICE.

ROBERT M. BOWMAN AND WILLIAM H. BOWMAN, OF LONDON, OHIO.

IMPROVEMENT IN CORN-PLANTERS.

Specification forming part of Letters Patent No. 129,924, dated July 30, 1872.

Specification describing a new and useful Improvement in Corn-Planters, invented by ROBERT M. BOWMAN and WM. H. BOWMAN, of London, in the county of Madison and State of Ohio.

Figure 1 is a detail sectional view of our improved device taken through the line $x\,x$, Fig. 2. Fig. 2 is a detail sectional view of the same taken through the line $y\,y$, Fig. 1.

Similar letters of reference indicate corresponding parts.

Our invention has for its object to furnish an improved seed-dropper for corn-planters which shall be so constructed that it cannot clog or choke with chaff, and which shall at the same time be simple in construction and easily worked; and it consists in the construction and combination of various parts, as hereinafter more fully described.

A represents the bottom of the hopper, which is made with an upwardly-projecting flange, $a^1$, around its four sides, which flange has a shoulder upon its outer surface to receive the lower edges of the sides of the hopper. In the middle part of the bottom A is formed a slot to receive the dropping-slide B and allow the seed to come in contact with said slide. In the bottom A, near its rear side, is formed a cross-partition, $a^2$, the middle part of which is made with an offset, $a^3$, which covers the rear part of the slide B, and in front of which is designed to be secured the cut-off, which prevents any more seed than enough to fill the hole in the slide B from being carried out by said slide. The slide B is supported by and slides upon four lugs, C, attached to or formed upon the under side of the bottom A at the four corners of the slot in said bottom, in which the said slide B works. Upon the lower side of the side edges of the bottom A are formed downwardly-projecting flanges $a^4$, the lower parts of which project outward and have holes formed through them to receive the bolts by which the side flanges $b'$ of the throat-plate D are secured to the said plate A. The throat-plate D is made narrower than the slide B, as shown in Fig. 2, and inclines slightly downward toward its forward end, as shown in Fig. 1. Upon the under side of the slide B, around the hole through said slide, is formed a ring-flange, $b'$, the lower edge of which does not touch the throat-plate D, but comes so near to it that the seed cannot escape between the said plate D and the lower edge of the said flange $b'$, but will slide along said plate D until it reaches the throat or discharge-opening in said plate, through which it falls to the ground.

By this construction the chaff can pass out freely, and cannot clog or impede the slide, which at the same time has no flanges or grooves for the chaff to get into and thus clog it.

Having thus described our invention, we claim as new and desire to secure by Letters Patent—

The slotted bottom A, with upward flange $a^1$ to fit within hopper and cross-partition $a^2\,a^3$, the sliding dropper B having ring-flange $b'$, and the upwardly-tapering throat-plate D having lugs C, constructed and arranged and put together as and for the purpose described.

ROBERT M. BOWMAN.
WILLIAM H. BOWMAN.

Witnesses:
NOAH THOMAS,
W. H. McCORMICK.